(12) United States Patent
Hashimoto et al.

(10) Patent No.: US 11,332,403 B2
(45) Date of Patent: *May 17, 2022

(54) VEHICLE MOUNTED DISPLAY DEVICE

(71) Applicant: AGC Inc., Chiyoda-ku (JP)

(72) Inventors: Kyohei Hashimoto, Tokyo (JP); Atsushi Inoue, Tokyo (JP); Yasuhiro Inoue, Tokyo (JP); Yasumasa Kato, Tokyo (JP); Yasuji Fukasawa, Tokyo (JP); Yusuke Kobayashi, Tokyo (JP); Masaaki Konishi, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 42 days.

This patent is subject to a terminal disclaimer.

(21) Appl. No.: 16/545,241

(22) Filed: Aug. 20, 2019

(65) Prior Publication Data
US 2019/0375673 A1   Dec. 12, 2019

Related U.S. Application Data

(63) Continuation of application No. 15/812,618, filed on Nov. 14, 2017, now Pat. No. 10,450,218, which is a
(Continued)

(30) Foreign Application Priority Data

Jun. 5, 2015 (JP) .............................. JP2015-114616

(51) Int. Cl.
*C03C 3/087* (2006.01)
*C03C 3/093* (2006.01)
(Continued)

(52) U.S. Cl.
CPC ............... *C03C 3/087* (2013.01); *B32B 7/12* (2013.01); *B32B 17/06* (2013.01); *B60K 37/02* (2013.01);
(Continued)

(58) Field of Classification Search
None
See application file for complete search history.

(56) References Cited

U.S. PATENT DOCUMENTS 4,878,738 A    11/1989 Hanami
5,808,707 A    9/1998 Niibori et al.
(Continued)

FOREIGN PATENT DOCUMENTS

DE    11 2015 003 842 T5    5/2017
DE    11 2015 004 049 T5    6/2017
(Continued)

OTHER PUBLICATIONS

Consumer Reports, Apr. 2013, "Connect with your car; How to plug in your music, apps, and lifestyle" (no author) (Year: 2013).*
(Continued)

*Primary Examiner* — David Sample
(74) *Attorney, Agent, or Firm* — Oblon, McClelland, Maier & Neustadt, L.L.P.

(57) ABSTRACT

The present invention relates to a vehicle-mounted display device disposed in an interior member of a vehicle. The vehicle-mounted display device of the invention includes: a display panel; a cover glass covering the display panel; a housing accommodating the display panel; and a holding portion holding a position of the housing, in which the cover glass is a tempered glass having a thickness being 0.5 to 2.5 mm, a thickness of a compressive stress layer being 10 μm or more, and a surface compressive stress of the compressive stress layer being 650 MPa or higher, and when the thickness (unit: mm) of the cover glass is represented by x and an energy absorption rate (unit: %) of the holding portion is represented by y, Expression (1) is satisfied, and impact resistance of the cover glass is excellent:

$$y \geq -37.1 \times \ln(x) + 53.7 \qquad (1).$$

17 Claims, 8 Drawing Sheets

Related U.S. Application Data continuation of application No. PCT/JP2016/066076, filed on May 31, 2016.

(51) Int. Cl.

| | | |
|---|---|---|
| *B60K 37/02* | (2006.01) | |
| *C03C 21/00* | (2006.01) | |
| *B32B 17/06* | (2006.01) | |
| *G02F 1/1333* | (2006.01) | |
| *B32B 7/12* | (2006.01) | |
| *C03C 3/076* | (2006.01) | |

(52) U.S. Cl.
CPC .............. *C03C 3/076* (2013.01); *C03C 3/093* (2013.01); *G02F 1/133308* (2013.01); *B60K 2370/343* (2019.05); *B60K 2370/63* (2019.05); *B60K 2370/693* (2019.05); *C03C 21/002* (2013.01); *G02F 1/133331* (2021.01); *G02F 2201/503* (2013.01)

(56) References Cited

U.S. PATENT DOCUMENTS

| | | | |
|---|---|---|---|
| 6,067,133 | A | 5/2000 | Niibori et al. |
| 10,450,218 | B2 * | 10/2019 | Hashimoto ............. C03C 3/087 |
| 2009/0202808 | A1 | 8/2009 | Glaesemann et al. |
| 2009/0208739 | A1 * | 8/2009 | Husemann .......... C08F 293/005 |
| | | | 428/354 |
| 2010/0119846 | A1 | 5/2010 | Sawada |
| 2011/0279961 | A1 | 11/2011 | Shedletsky et al. |
| 2013/0029075 | A1 | 1/2013 | Niiyama et al. |
| 2013/0086946 | A1 | 4/2013 | Glaesemann et al. |
| 2013/0095310 | A1 | 4/2013 | Glaesemann et al. |
| 2013/0107143 | A1 * | 5/2013 | Dighde ............. G02F 1/133308 |
| | | | 349/1 |
| 2013/0169900 | A1 | 7/2013 | Dighde |
| 2013/0199241 | A1 | 8/2013 | Sawada |
| 2014/0232969 | A1 | 8/2014 | Tsubaki et al. |
| 2015/0124382 | A1 | 5/2015 | Taniguchi et al. |
| 2015/0147538 | A1 | 5/2015 | Ishimaru et al. |
| 2017/0038515 | A1 | 2/2017 | Yuki et al. |
| 2017/0101340 | A1 | 4/2017 | Inoue et al. |

FOREIGN PATENT DOCUMENTS

| | | |
|---|---|---|
| EP | 0 730 185 A2 | 9/1996 |
| JP | 9-73072 | 3/1997 |
| JP | 2001-347895 A | 12/2001 |
| JP | 2011-510903 | 4/2011 |
| JP | 2013-14512 A | 1/2013 |
| JP | 2013-18355 | 1/2013 |
| JP | 2014-1124 | 1/2014 |
| JP | 2014-160218 A | 9/2014 |
| JP | 2014-178640 | 9/2014 |
| JP | 2014-215702 A | 11/2014 |
| WO | WO 2011/148990 A1 | 12/2011 |
| WO | WO 2011-158839 | 12/2011 |
| WO | WO 2013/179882 A1 | 12/2013 |
| WO | WO 2013/186818 A1 | 12/2013 |
| WO | WO 2014/042062 A1 | 3/2014 |

OTHER PUBLICATIONS

International Search Report dated Aug. 16, 2016 in PCT/JP2016/066076, filed on May 31, 2016 (with English Abstract).
Written Opinion dated Aug. 16, 2016 in PCT/JP2016/066076, filed on May 31, 2016.

* cited by examiner

[FIG. 1]
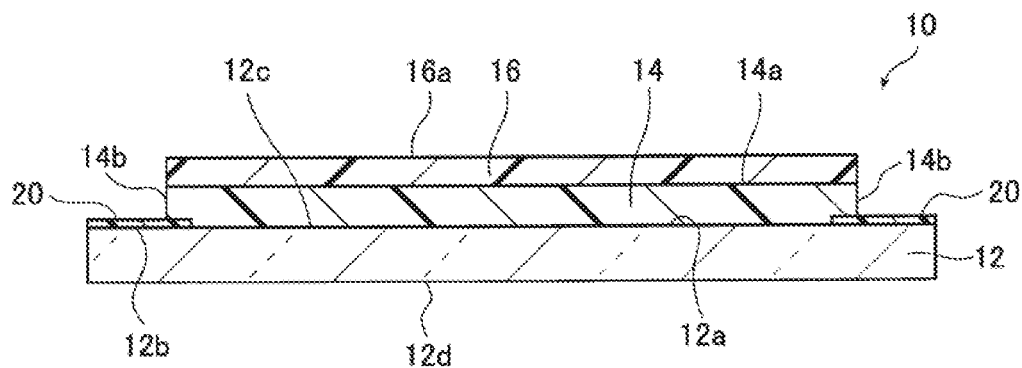
[FIG. 2]
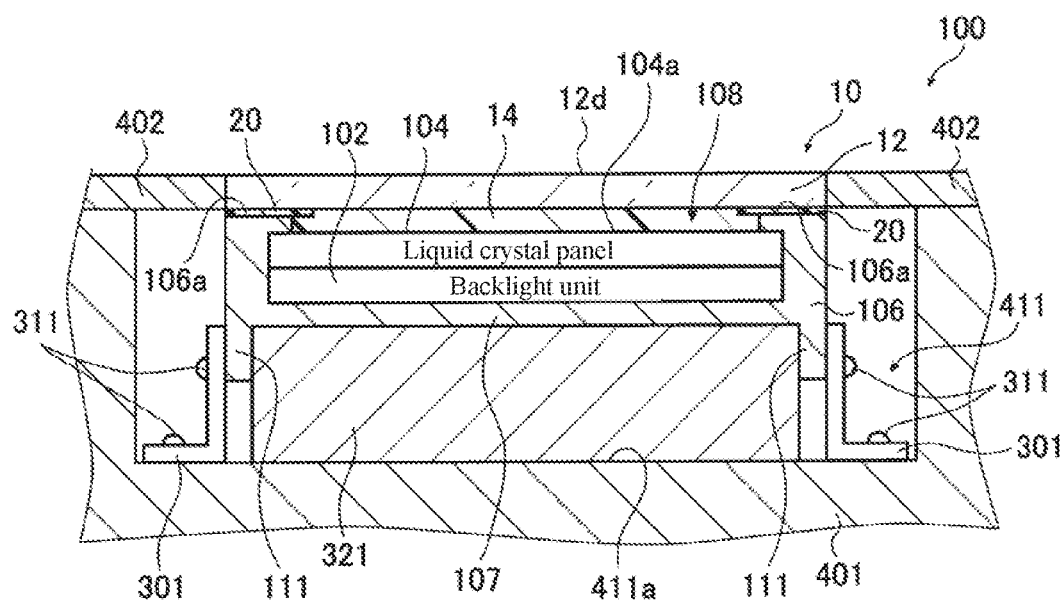

[FIG. 3]
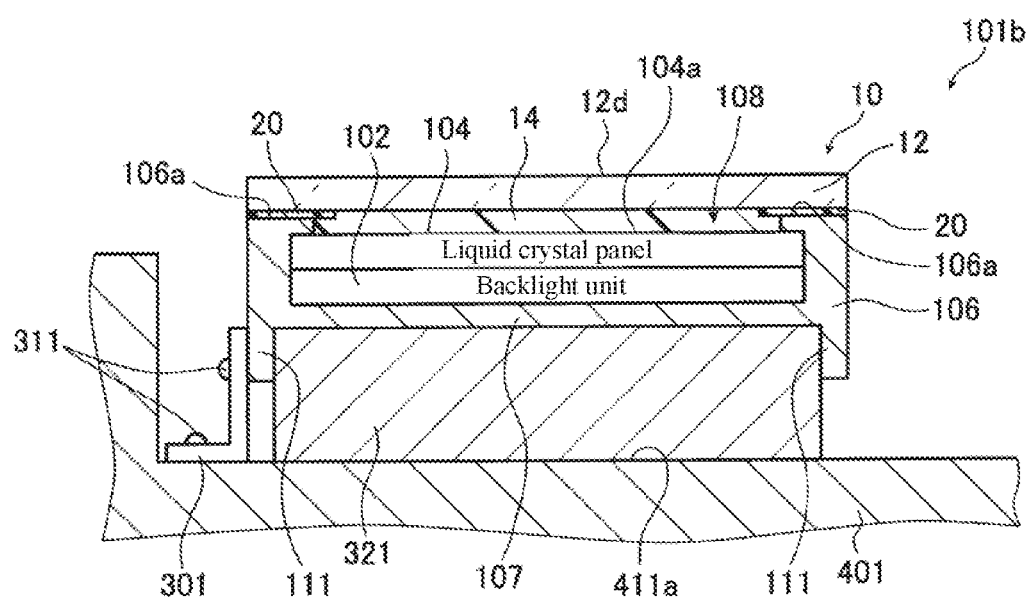

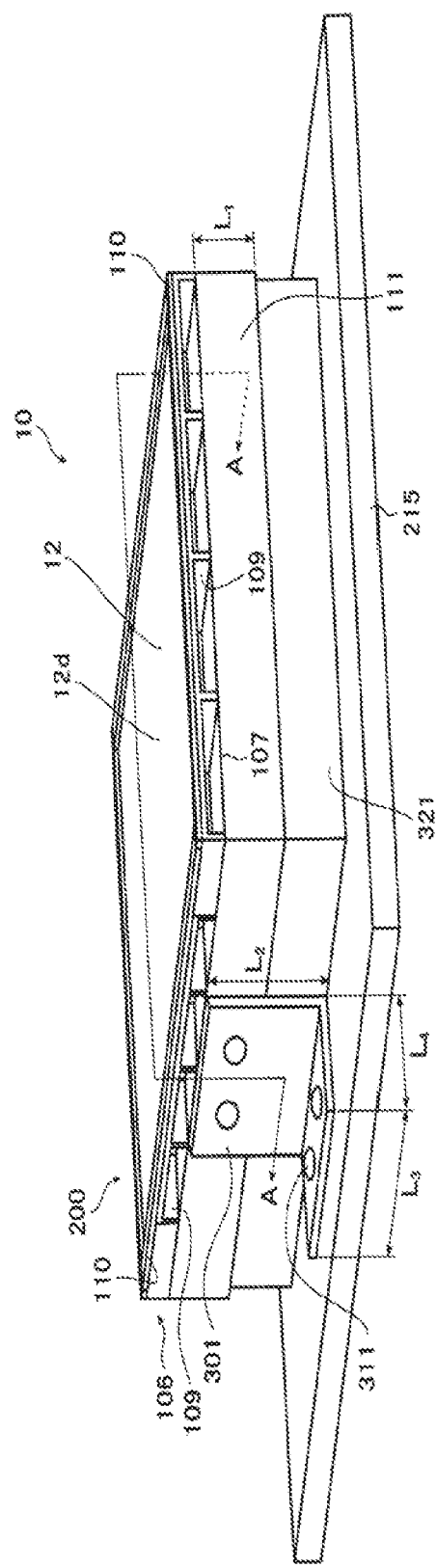
[FIG. 4]

[FIG. 5]
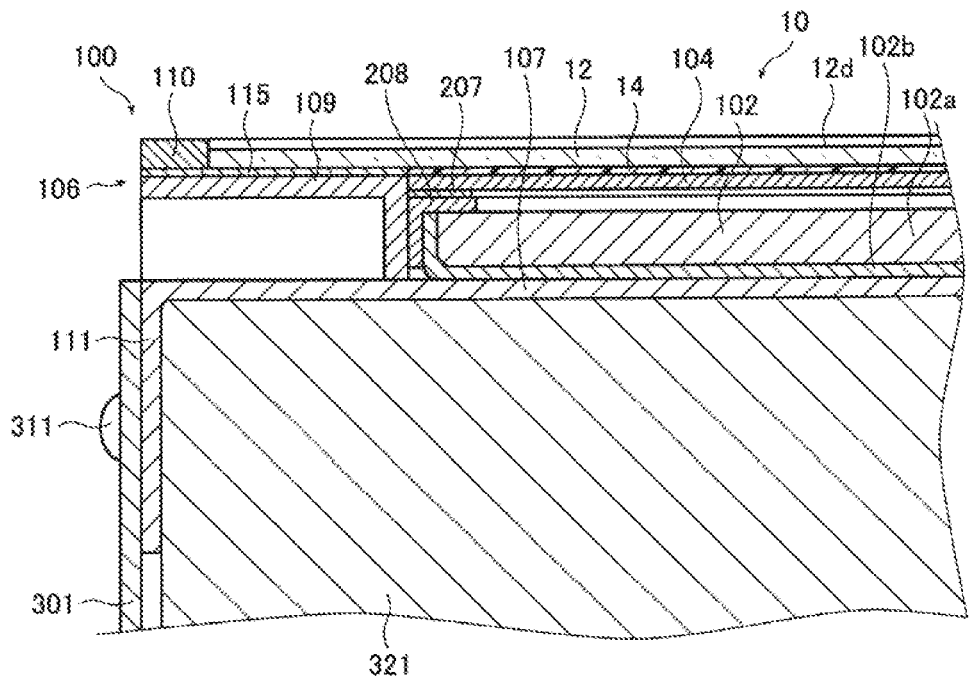
[FIG. 6]
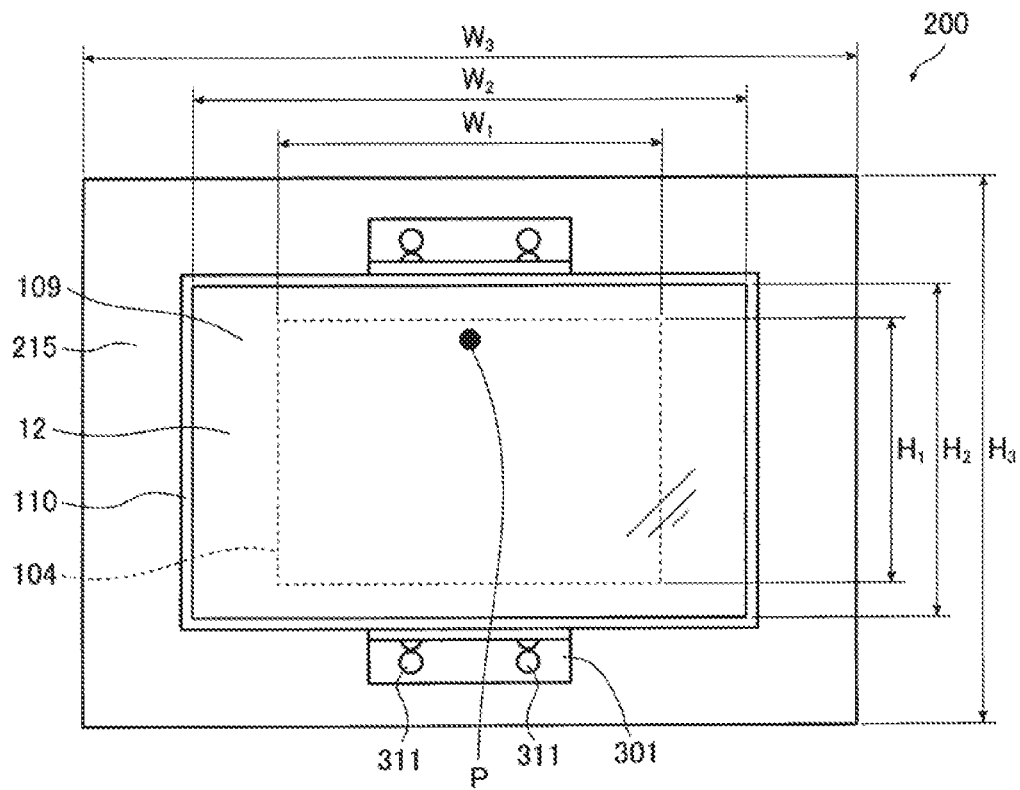

[FIG. 7]
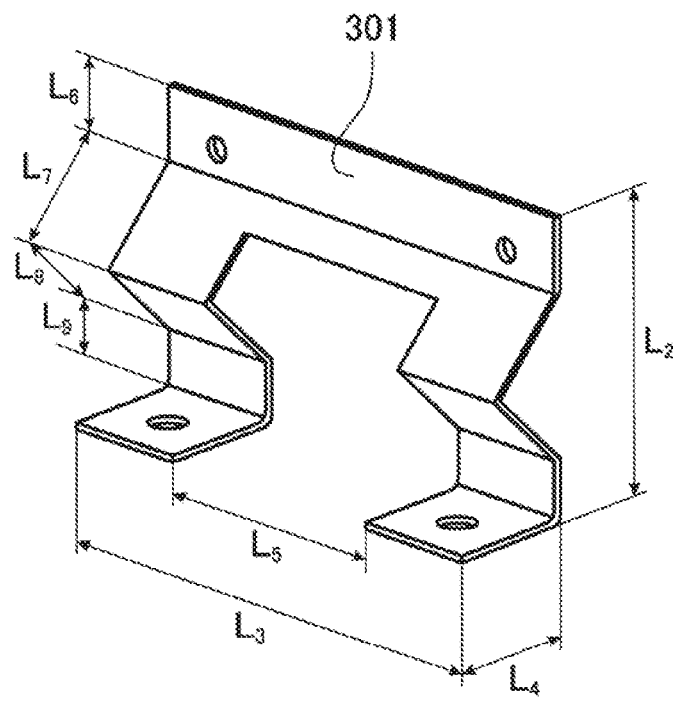
[FIG. 8]
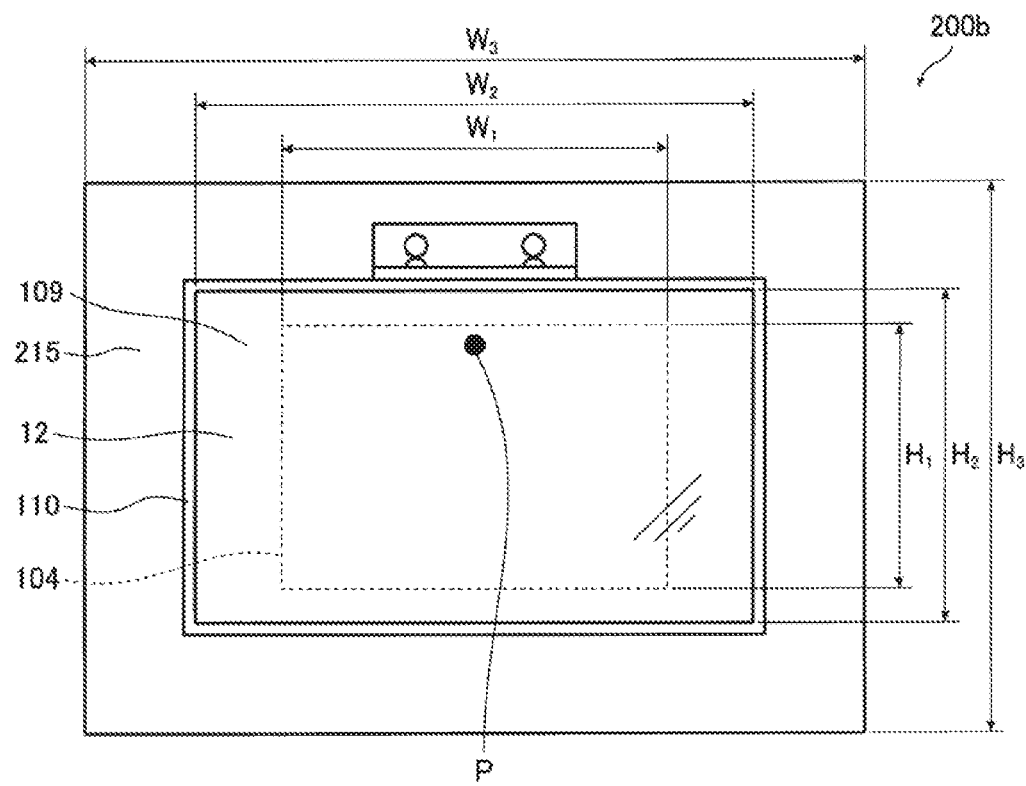

[FIG. 9]
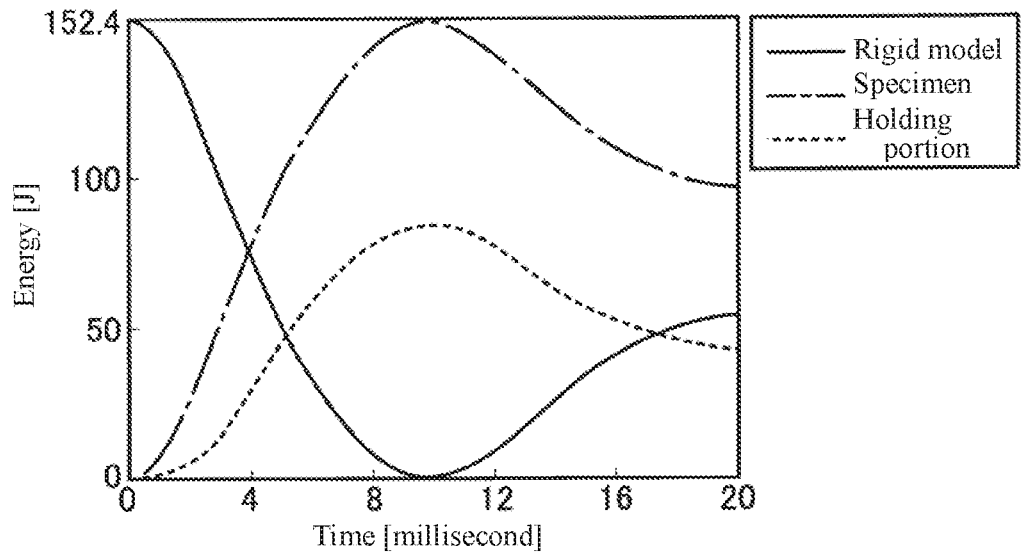
[FIG. 10]
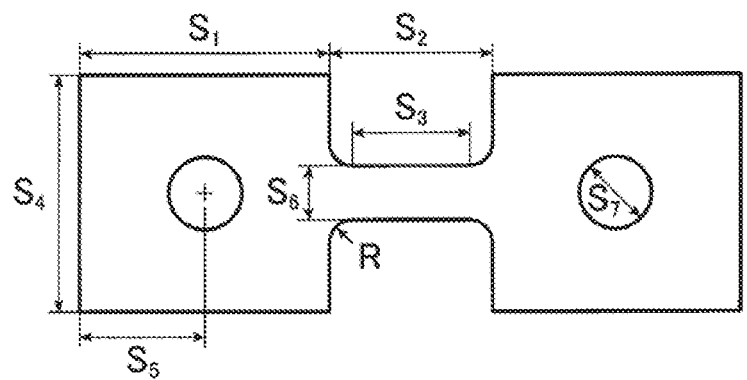

[FIG. 11]
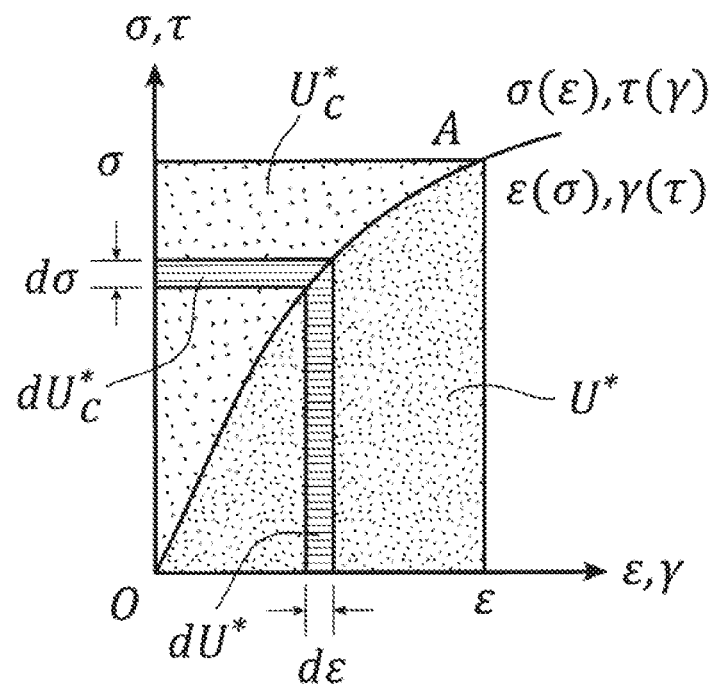
$$U^* = \int_0^\varepsilon \sigma(\varepsilon)d\varepsilon + \int_0^\gamma \tau(\gamma)d\gamma$$
$$U_C^* = \int_0^\sigma \varepsilon(\sigma)d\sigma + \int_0^\gamma \gamma(\tau)d\tau$$

[FIG. 12]
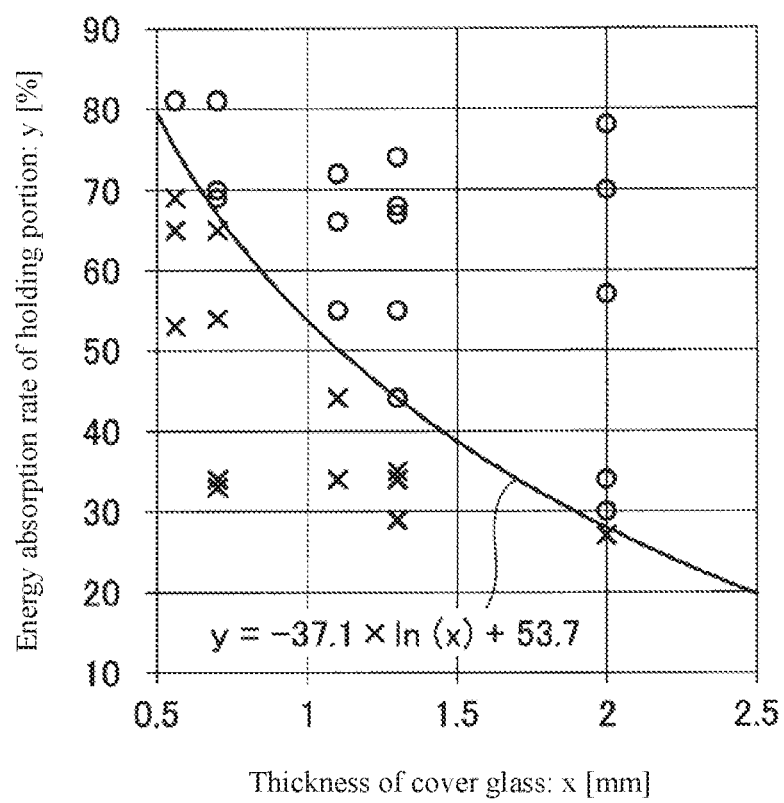

VEHICLE MOUNTED DISPLAY DEVICE

CROSS REFERENCE TO RELATED APPLICATIONS

This application is a continuation of U.S. application Ser. No. 15/812,618, filed on Nov. 14, 2017, which is a continuation of PCT/JP2016/066076, filed on May 31, 2016, the text of which is incorporated herein by reference, and claims foreign priority to Japanese Patent Application No. 2015-114616, filed on Jun. 5, 2015, the entire contents of which are incorporated herein by reference.

TECHNICAL FIELD

The present invention relates to a vehicle-mounted display device.

BACKGROUND ART

Conventionally, in order to protect a display panel of a display device including a liquid crystal panel or the like, a transparent protective member that covers a display surface (display area) of the display panel has been used. As the protective member for protecting the display device, for example, Patent Document 1 describes an adhesive layer-equipped transparent plate having an adhesive layer formed on a surface.

CITATION LIST

Patent Document

Patent Document 1: WO 2011/148990

SUMMARY OF THE INVENTION

Problem that the Invention is to Solve

In a vehicle such as an automobile, a vehicle-mounted display device such as a car navigation device is mounted.

Examples of a type of the vehicle-mounted display device include a standing type that stands on the outside of a dashboard and an embedded type that is embedded in a dashboard.

In these vehicle-mounted display devices, a transparent protective member such as a film is used from the viewpoint of protecting a display panel. Recently, from the viewpoint of the texture, the use of a glass protective member (cover glass) instead of a film has been desired. Furthermore, among glasses, laminated glass tends to increase in thickness and thus, a design problem is likely to occur, and the costs are high. Therefore, the use of tempered glass is required.

For cover glass for a vehicle-mounted display device, excellent impact resistance is required from the viewpoint of safety such that it does not break even when colliding with the head or the like of a passenger in a collision accident of a vehicle. Impact caused by a collision accident has a much higher energy than impact which is assumed to occur in, for example, a stationary display device such as a liquid crystal television. Therefore, high impact resistance is required for cover glass.

The present invention has been made in consideration of the above-described circumstances, and an object thereof is to provide a vehicle-mounted display device having excellent impact resistance of cover glass.

Means for Solving the Problem

As a result of thorough investigation for achieving the above-describe object, the present inventors found that, in the case where the thickness of cover glass as a specific tempered glass and the energy absorption rate of a holding portion that holds the position of a housing satisfy specific conditions, the impact resistance of the cover glass is excellent, thereby completing the present invention.

That is, the vehicle-mounted display device according to an aspect of the present invention is a vehicle-mounted display device that is disposed in an interior member of a vehicle, the vehicle-mounted display device including: a display panel; a cover glass that covers the display panel; a housing that accommodates the display panel; and a holding portion that holds a position of the housing, in which the cover glass is a tempered glass having a thickness being from 0.5 to 2.5 mm, a thickness of a compressive stress layer being 10 μm or more, and a surface compressive stress of the compressive stress layer being 650 MPa or higher, and when the thickness (unit: mm) of the cover glass is represented by x and an energy absorption rate (unit: %) of the holding portion is represented by y, the following Expression (1) is satisfied:

$$y \geq -37.1 \times \ln(x) + 53.7 \qquad (1).$$

Advantageous Effect of the Invention

According to the present invention, a vehicle-mounted display device having excellent impact resistance of cover glass can be provided.

BRIEF DESCRIPTION OF THE DRAWINGS

FIG. 1 is a schematic cross-sectional view illustrating an adhesive layer-equipped cover glass.

FIG. 2 is a schematic cross-sectional view illustrating a vehicle-mounted display device.

FIG. 3 is a schematic cross-sectional view illustrating a modification example of the vehicle-mounted display device.

FIG. 4 is a perspective view illustrating a specimen.

FIG. 5 is a cross-sectional view taken along line A-A of FIG. 4.

FIG. 6 is a plan view illustrating the specimen.

FIG. 7 is a perspective view illustrating a modification example of a fixing portion.

FIG. 8 is a plan view illustrating a modification example of the specimen.

FIG. 9 is a graph showing an example of the result of a simulation.

FIG. 10 is a plan view illustrating a specimen in a tensile test.

FIG. 11 is a view illustrating a strain energy density U.

FIG. 12 is a graph in which the results of evaluating impact resistance are plotted.

MODE FOR CARRYING OUT THE INVENTION

Hereinafter, an embodiment of the present invention will be described with reference to the drawings. However, the present invention is not limited to the following embodiment, and various modifications and substitutions can be made in the following embodiment within a range not departing from the scope of the present invention.

Hereinafter, first, an adhesive layer-equipped cover glass used in a vehicle-mounted display device according to the present embodiment will be described, and then the vehicle-mounted display device according to the present embodiment will be described.

In the present embodiment, as a method of manufacturing the vehicle-mounted display device, an embodiment of producing an adhesive layer-equipped cover glass and bonding it to a display panel will be described as an example, but the method of manufacturing the vehicle-mounted display device is not limited thereto. For example, the cover glass may be bonded to the display panel through an optically clear adhesive (OCA) film or the like.

[Adhesive Layer-Equipped Cover Glass]

FIG. 1 is a schematic cross-sectional view illustrating an adhesive layer-equipped cover glass. The adhesive layer-equipped cover glass 10 illustrated in FIG. 1 includes a transparent cover glass 12, an adhesive layer 14, a protective film 16, and a light shielding portion 20.

The adhesive layer 14 is provided on a first main surface 12c of the cover glass 12. A region of the cover glass 12 where the adhesive layer 14 is provided will be called a disposition region 12a.

The cover glass 12 and the adhesive layer 14 have a shape of, for example, a square shape, and the adhesive layer 14 has a smaller external shape. For example, the adhesive layer 14 is disposed on the cover glass 12 such that their centers coincide with each other. On the first main surface 12c of the cover glass 12, the light shielding portion 20 is formed in a frame shape in a peripheral portion 12b in the periphery of the disposition region 12a.

The light shielding portion 20 shields a wiring member and the like of the display panel described below such that they are not visible from a second main surface 12d side of the cover glass 12. However, in the case, for example, where the wiring member and the like of the display panel have a structure that is invisible from a display panel observation side, the light shielding portion 20 is not necessarily provided.

On the first main surface 14a of the adhesive layer 14, the protective film 16 that covers the entire area of the cover glass 12 is detachably provided. When the adhesive layer-equipped cover glass 10 is bonded to the vehicle-mounted display device, the protective film 16 is detached. The protective film 16 is not particularly limited and, for example, a relatively flexible film such as polyethylene or polypropylene can be used.

[Cover Glass]

As the cover glass 12, tempered glass such as chemically tempered glass or physically tempered glass can be used. Among these, chemically tempered glass is preferable from the viewpoint of strength, design, costs, and the like.

Examples of the kind of glass for the cover glass 12 include soda-lime glass, aluminosilicate glass ($SiO_2$—$Al_2O_3$—$Na_2O$ glass), and so on. Among these, aluminosilicate glass is preferable from the viewpoint of strength.

A compressive stress layer is formed on a surface of the cover glass 12 as the tempered glass. The thickness of the compressive stress layer is 10 μm or more, preferably 15 μm or more, more preferably 25 μm or more, and still more preferably 30 μm or more.

The surface compressive stress of the compressive stress layer in the cover glass 12 as the tempered glass is 650 MPa or higher and preferably 750 MPa or higher.

Preferred examples of such a cover glass 12 include tempered glass obtained by tempering aluminosilicate glass (e.g., "DRAGONTRAIL" (registered trade name)).

Examples of a glass material constituting the cover glass 12 include a glass material containing, indicated by mol %, from 50 to 80% of $SiO_2$, from 1 to 20% of $Al_2O_3$, from 6 to 20% of $Na_2O$, from 0 to 11% of $K_2O$, from 0 to 15% of MgO, from 0 to 6% of CaO, and from 0 to 5% of $ZrO_2$.

Examples of a method of obtaining tempered glass (chemically tempered glass) by conducting a chemical tempering on glass typically include a method of dipping glass in $KNO_3$ molten salt, performing an ion exchange treatment, and cooling to around room temperature. Treatment conditions such as the temperature of the $KNO_3$ molten salt or the dipping time may be set such that the surface compressive stress and the thickness of the compressive stress layer are desired values.

The thickness of the cover glass 12 is from 0.5 to 2.5 mm. In the case where the thickness is less than 0.5 mm, the strength of the cover glass 12 itself is insufficient and the impact resistance may deteriorate. On the other hand, in the case where the thickness is more than 2.5 mm, thickness is excessively large and thus it is not suitable for the vehicle-mounted display device from the viewpoint of design.

The thickness of the cover glass is preferably from 0.7 to 2.0 mm and more preferably from 1.3 to 2.0 mm.

An external shape and size of the cover glass 12 are appropriately determined depending on an external shape of the vehicle-mounted display device. In general, the external shape of the vehicle-mounted display device is a rectangular shape such as a rectangle. Therefore, in this case, the external shape of the cover glass 12 is a rectangular shape. Depending on the external shape of the vehicle-mounted display device, the cover glass 12, which covers the entire area of a display surface of the display panel, having a shape with an external shape including a curve, can be used.

In the case of a rectangular shape for example, the size of the cover glass 12 is for example, from 100 to 800 mm in a longitudinal direction and from 40 to 300 mm in a transverse direction.

[Adhesive Layer]

The adhesive layer 14 is transparent as in the cover glass 12, and it is preferable that a difference in refractive index between the cover glass 12 and the adhesive layer 14 is small.

Examples of the adhesive layer 14 include a layer formed of a transparent resin which is obtained by curing a liquid curable resin composition. Examples of the curable resin composition include a photocurable resin composition and a thermally curable resin composition. Among these, a photocurable resin composition containing a curable compound and a photopolymerization initiator is preferable. Preferable examples of the curable resin composition include a photocurable resin composition for forming a layered portion described in WO 2011/148990.

As described above, the adhesive layer 14 may be an OCA film (OCA tape). In this case, the OCA film is bonded to the cover glass 12.

The thickness of the adhesive layer 14 is, for example, from 5 to 400 μm and preferably from 50 to 200 μm. In addition, the storage shear modulus of the adhesive layer 14 is, for example, from 5 kPa to 5 MPa and preferably from 1 MPa to 5 MPa.

[Method of Manufacturing Adhesive Layer-Equipped Cover Glass]

A method of manufacturing the adhesive layer-equipped cover glass 10 will be described. Hereinafter, an embodiment of applying a liquid resin composition to the cover glass 12 and curing it will be described.

First, the light shielding portion 20 is formed in a frame shape in the peripheral portion 12b of the cover glass 12. Then, a curable resin composition is applied by using, for example, a method with a die coater, a roll coater or the like over the entire area of the first main surface 12c of the cover glass 12 with covering the light shielding portion 20, to thereby form a curable resin composition film (not illustrated). The curable resin composition film is cut as described below to form the adhesive layer 14.

Next, a film material (not illustrated) is bonded to a surface of the curable resin composition film. The film material is cut as described below to form the protective film 16. After bonding the film material to the surface of the curable resin composition film, the curable resin composition film is cured by a photocuring treatment or a thermal curing treatment. As a result, a laminate in which the curable resin composition film is protected by the film material is obtained.

Next, in the obtained laminate, a position which forms a side surface 14b of the adhesive layer 14 is taken as a cutting plane line, and the laminate is cut along the cutting plane line using laser beams. As a result, the adhesive layer-equipped cover glass 10 in which the protective film 16 is provided on the first main surface 14a of the adhesive layer 14 is obtained.

In the case where the film of the adhesive layer 14 which is cured in advance is bonded to the cover glass 12 or in the case where the resin composition can be accurately applied, the cutting step may be omitted.

In addition, as described above, an OCA film (OCA tape) as the adhesive layer 14 may be bonded to the cover glass 12. In this case, similarly, the cutting step can be omitted.

[Vehicle-Mounted Display Device]

Next, a vehicle-mounted display device 100 according to the present embodiment will be described.

FIG. 2 is a schematic cross-sectional view illustrating the vehicle-mounted display device. The vehicle-mounted display device 100 according to the present embodiment is a so-called embedded type vehicle-mounted display device, and is used in a state where it is embedded in a recessed portion 411 provided in an interior member 401 such as a dashboard. However, the vehicle-mounted display device is not limited to this configuration. For example, it may be a standing type vehicle-mounted display device.

The vehicle-mounted display device 100 includes a housing 106 that accommodates respective parts. A backlight unit 102 is disposed on a housing bottom plate 107 which is a bottom plate of the housing 106. A liquid crystal panel 104 as the display panel is disposed on the backlight unit 102. This way, the backlight unit 102 and the liquid crystal panel 104 are accommodated in the housing 106. An opening portion 108 is formed on the housing 106, and the liquid crystal panel 104 is disposed on the opening portion 108 side. A region of the liquid crystal panel 104 corresponding to the opening portion 108 is taken as a display surface 104a.

Configurations of the backlight unit 102 and the liquid crystal panel 104 are not particularly limited and well-known configurations can be used. In addition, a material or the like of the housing 106 (including the housing bottom plate 107) is also not particularly limited.

As illustrated in FIG. 2, in the opening portion 108 of the housing 106, there is a step difference between the display surface 104a of the liquid crystal panel 104 and an end surface 106a of the housing 106.

After detaching the protective film 16 from the adhesive layer-equipped cover glass 10, the adhesive layer 14 is bonded to the display surface 104a of the liquid crystal panel 104 so as to be embedded in the opening portion 108 of the housing 106. As a result, the cover glass 12 covers over the display surface 104a of the vehicle-mounted display device 100 to the end surface 106a of the housing 106. This way, the cover glass 12 functions as a protective member of the display surface 104a of the vehicle-mounted display device 100.

The housing 106 of the vehicle-mounted display device 100 is accommodated in the recessed portion 411 of the interior member 401.

At this time, a rectangular parallelepiped cushioning material 321 as an impact absorbing portion having impact absorbability is disposed on a bottom surface 411a of the recessed portion 411. That is, the cushioning material 321 is disposed on a back surface side of the housing 106 (opposite to the opening portion 108). The housing 106 is positioned at a predetermined height in the recessed portion 411 by the cushioning material 321. As the cushioning material 321, a commercially available product can be used, and specific examples thereof include "CF45" manufactured by K.C.C. Shokai Ltd.

In the present embodiment, the cushioning material 321 is exemplified as the impact absorbing portion that is disposed on the back surface side of the housing 106. However, it is not limited thereto, and for example, a member having impact absorbability other than the cushioning material 321; or a mechanism having impact absorbability such as a honeycomb mechanism, a rotation mechanism, or a sliding mechanism can be used.

In addition, in the recessed portion 411, the position of the housing 106 is fixed by a fixing portion 301 and a bolt 311. The fixing portion 301 is a plate-shaped member having an L-shape in cross-section as illustrated as an example in FIG. 2 but is not limited thereto. For example, it may be a modification example of FIG. 7 described below or the like.

For example, FIG. 2 and the like illustrate a configuration in which two long sides of the housing 106 are held by the fixing portion 301, but the embodiment is not limited thereto. For example, one side, three sides or four sides of the housing 106 may be held by the fixing portion 301. Furthermore, another position of the housing 106 may be held.

FIG. 3 is a schematic cross-sectional view illustrating a modification example of the vehicle-mounted display device. The same components as those described with reference to FIG. 1 and FIG. 2 will be represented by the same reference numerals, and the description thereof will be omitted. A vehicle-mounted display device 100b illustrated in FIG. 3 is a "cantilever type" vehicle-mounted display device in which only one side of the housing 106 is held by the fixing portion 301. This can be considered as a standing type vehicle-mounted display device.

A material of the fixing portion 301 is, for example, metal such as iron (including steel) or aluminum. The fixing portion 301 and the housing 106 are joined through the bolt 311. Likewise, the fixing portion 301 and the bottom surface 411a of the recessed portion 411 are joined through the bolt 311. This way, the position of the housing 106 is fixed in the recessed portion 411.

Accordingly, the cushioning material 321 and the fixing portion 301 (and the bolt 311) function as a holding portion that holds the position of the housing 106 in the recessed portion 411.

In the housing 106, a portion for fixing by the fixing portion 301 may be provided. For example, as illustrated in FIG. 2, a housing protrusion portion 111 that is a member protruding to a side opposite to the cover glass 12 side may be provided in the housing bottom plate 107. In this case, as illustrated in FIG. 2, the fixing portion 301 and the housing protrusion portion 111 are joined through the bolt 311.

The housing protrusion portion 111 may be provided at each of four edges of the housing bottom plate 107 having a rectangular shape, or may be provided only at each of a pair of two edges opposite to each other. Basically, it is preferable that the housing protrusion portion 111 is integrated with the housing bottom plate 107. The housing protrusion portion 111 is a plate-shaped member as illustrated as an example in FIG. 2. The shape is not particularly limited as long as it can be joined by the fixing portion 301 and the bolt 311.

In the vicinity of the vehicle-mounted display device 100 embedded in the interior member 401, as illustrated in FIG. 2, a cover 402 may be provided so as to cover a part of the recessed portion 411.

When colliding with head or the like of a passenger in a collision accident of a vehicle, an external force is applied to the cover glass 12 of the vehicle-mounted display device 100 in a direction of being pushed into the recessed portion 411 of the interior member 401. Due to this external force, the fixing portion 301 and the cushioning material 321 that hold the position of the housing 106 are deformed. That is, at least a part of kinetic energy at the collision is converted into strain energy of the holding portion (the fixing portion 301 and the cushioning material 321) (refer to a graph described below in FIG. 9). That is, a part of the kinetic energy at the collision is absorbed by the holding portion.

Here, the degree to which the energy at the collision is absorbed by the holding portion will be called "energy absorption rate (unit: %)". The energy absorption rate can be calculated from a predetermined simulation as shown in [EXAMPLES] described below. The present inventors found that, in the case where the energy absorption rate of the holding portion satisfies specific conditions, the cover glass 12 of the vehicle-mounted display device 100 exhibits excellent impact resistance such that it does not break even when colliding with head or the like of a passenger in a collision accident of a vehicle. In addition, they found that the energy absorption rate depends on the thickness of the cover glass 12.

That is, the present inventors found that, when the thickness (unit: mm) of the cover glass is represented by x and an energy absorption rate (unit: %) of the holding portion is represented by y, the impact resistance of the cover glass is excellent in the case of satisfying the following Expression (1).

$$y \geq -37.1 \times \ln(x) + 53.7 \quad (1)$$

It can be seen from [EXAMPLES] described below that the impact resistance of the cover glass is excellent in the case of satisfying the Expression (1). That is, [EXAMPLES] described below shows that, in the case where Expression (1) is not satisfied (Comparative Example), the cover glass breaks; on the other hand, in the case where Expression (1) is satisfied (Example), the cover glass does not break.

In the vehicle-mounted display device 100, the configuration of the holding portion is not particularly limited as long as Expression (1) is satisfied. Within a range where the Expression (1) is satisfied, the holding portion is appropriately selected.

For example, in the case where the holding portion is formed of the fixing portion 301 and the impact absorbing portion such as the cushioning material 321, within a range where Expression (1) is satisfied, for example, the shape, material, thickness, and the like of the fixing portion 301 may be changed depending on the thickness of the cover glass 12, the material of the cushioning material 321 as the impact absorbing portion may be changed, or a member or a mechanism other than the cushioning material 321 may be chosen as the impact absorbing portion.

In the above description, the vehicle-mounted display device including a liquid crystal panel as the display panel is exemplified. However, it is not limited thereto and, for example, may be one including an organic EL panel, a PDP, an electronic ink panel, or the like. In addition, it may also include a touch panel or the like.

Examples of such a vehicle-mounted display device include an embedded type car navigation device that is embedded in a dashboard of a vehicle. Also, it may be a device (e.g., an instrument panel) other than a car navigation device.

EXAMPLES

Hereinafter, the embodiment of the present invention will be described in detail by reference to Examples, but the present invention is not limited to these Examples.

<Preparation of Cover Glass>

As the cover glass 12, tempered glass (DRAGONTRAIL (trade name), manufactured by Asahi Glass Co., Ltd., thickness of compressive stress layer: 38 μm, surface compressive stress of compressive stress layer: 774 MPa) obtained by tempering aluminosilicate glass was prepared.

<Preparation of Adhesive Layer-Equipped Cover Glass>

OCA ("MHM-FWD" manufactured by Nichiei Kakoh Co., Ltd., thickness: 150 μm) as the adhesive layer 14 was laminated on the first main surface 12c of the cover glass 12 to prepare the adhesive layer-equipped cover glass 10.

<Preparation of Specimen>

In order to perform a test in which a rigid model is collided (also called "head impact test"), a specimen 200 of an embedded type vehicle-mounted display device was prepared by using the adhesive layer-equipped cover glass 10. The specimen 200 will be described with reference to FIG. 4 to FIG. 6. In FIG. 4 to FIG. 6, the same (or corresponding) components as those of the vehicle-mounted display device 100 illustrated in FIG. 1 and FIG. 2 will be represented by the same reference numerals, and the description thereof will be omitted.

FIG. 4 is a perspective view illustrating the specimen. FIG. 5 is a cross-sectional view taken along line A-A of FIG. 4. FIG. 6 is a plan view illustrating the specimen.

As illustrated in FIG. 4 and FIG. 5, the specimen 200 includes the housing bottom plate 107, and has four housing frames 109 including a rib on their inside and disposed on the peripheral portion of the housing bottom plate 107. The housing bottom plate 107 and the four housing frames 109 form the housing 106 having a rectangular recessed portion in the center region. In the housing 106, the backlight unit 102 and the liquid crystal panel 104 are arranged.

As illustrated in FIG. 5, an end portion of the backlight unit 102 on the top surface side is covered with an L-shaped member 208 having an L-shape in cross-section. The top surface of the L-shaped member 208 and an end portion of the liquid crystal panel 104 on the bottom surface side are bonded through a double-sided tape 207. Therefore, an air gap (1.5 mm) corresponding to the thickness of the L-shaped member 208 and the double-sided tape 207 is present between the liquid crystal panel 104 and the backlight unit 102. The top surface position of the liquid crystal panel 104 is lower than the top surface position of the housing frame 109 disposed therearound, and a recessed portion is formed. The adhesive layer 14 of the adhesive layer-equipped cover glass 10 is bonded to the top surface of the liquid crystal panel 104 so as to be embedded in the recessed portion. The bottom surface of the cover glass 12 and the top surface of the housing frame 109 are bonded through a double-sided tape 115. A housing end frame 110 is disposed outside of an end surface of the cover glass 12 on the top surface of the housing frame 109. The housing end frame 110 is also bonded to the housing frame 109 through the double-sided tape 115.

As illustrated in FIG. 4 and FIG. 5, the plate-shaped housing protrusion portions 111 are provided in four sides of the housing bottom plate 107 continuously to the housing bottom plate 107. The housing bottom plate 107 and the four housing protrusion portions 111 form a recessed portion on the back surface side of the housing bottom plate 107 (opposite to the backlight unit 102 side). A part of the cushioning material 321 is inserted into the recessed portion. The cushioning material 321 is disposed on a flat support plate 215, and the housing 106 is supported by the cushioning material 321. As the cushioning material 321, basically, a laminate including two layers of "CF45", manufactured by K.C.C. Shokai Ltd. (thickness: 25.4 mm) was used. In some examples, however, the number of layers was "one" or "three", in the state where the housing 106 is supported by the cushioning material 321, one end side of the fixing portion 301 is joined to a pair of housing protrusion portions 111 opposite to each other, through the bolt 311. The other end side of the fixing portion 301 is joined to the support plate 215 through the bolt 311. This way, the position of the housing 106 including the housing protrusion portions 111 is fixed by the fixing portion 301.

Regarding the fixing portion 301 (in Table 1 below shown as "L-Shape") which is a plate-shaped member having an L-shape in cross-section, in examples where the number of cushioning materials 321 was "two", the sizes represented by $L_1$ to $L_4$ in FIG. 4 were set as $L_1$: 20 mm, $L_2$: 50 mm, $L_3$: 100 mm, and $L_4$: 20 mm. In an example (Example 25) in which the number of cushioning materials 321 was "one", the length of $L_2$ was reduced.

In some examples, a fixing portion 301b (in Table 1 below, shown as "Corrugated L-Shape) illustrated in FIG. 7, which is bent to be corrugated, was used instead of the fixing portion 301.

FIG. 7 is a schematic cross-sectional view illustrating a modification example of the fixing portion. The fixing portion 301b illustrated as the modification example in FIG. 7 is a U-shaped member obtained by cutting out a plate-shaped member. In a cross-sectional view (side view), the fixing portion 301b does not have an L-shape and is bent such that an intermediate portion thereof in a longitudinal direction protrudes (is corrugated).

At this time, in examples where the number of cushioning materials 321 was "two", the sizes represented by $L_2$ to $L_9$ in FIG. 7 were set as $L_2$: 50 mm, $L_3$: 80 mm, $L_4$: 20 mm, $L_5$: 40 mm, $L_6$: 14 mm, $L_7$: 18 mm, $L_8$: 18 mm, and $L_9$: 10 mm. In an example in which the number of cushioning materials was "three", the fixing portion 301b further extended, and the length of $L_2$ was increased.

The sizes represented by $H_1$ to $H_3$ and $W_1$ to $W_3$ in FIG. 6 were set as $H_1$: 120 mm, $H_2$: 150 mm, $H_3$: 250 mm, $W_1$: 173 mm, $W_2$: 250 mm, and $W_3$: 350 mm.

The thickness of the cover glass 12 was set among five values of 0.56 mm, 0.7 mm, 1.1 mm, 1.3 mm, and 2.0 mm.

In some examples, a "cantilever type" specimen 200b illustrated in FIG. 8 was used instead of the specimen 200.

FIG. 8 is a plan view illustrating a modification example of the specimen. The same components as those described with reference to FIG. 4 to FIG. 6 will be represented by the same reference numerals, and the description thereof will be omitted. In the specimen 200b illustrated in FIG. 8, as in the vehicle-mounted display device 100b (refer to FIG. 3), only one side of the housing 106 (one side on a collision position P side described below) is held by the fixing portion 301 (or the fixing portion 301b). As for an example in which such a "cantilever type" specimen 200b was used, characters "st" are added to the latter of the expression "L-Shape" or "Corrugated L-Shape" regarding the fixing portion in Table 1 below.

In addition, the other portions were prepared as follows.

Liquid crystal panel 104: a replacement was used in which a polarization plate (material: TAC) was bonded to each of opposite surfaces of soda-lime glass (thickness: 1.1 mm, size: 173 mm×120 mm).

Backlight unit 102: a replacement was used in which a bottom surface and four side surfaces of a plate-shaped body 102a (material: PC, thickness: 4 mm, size: 117 mm×170 mm) were covered with a recessed body 102b (material: aluminum, thickness: 1 mm).

Double-sided tape 207: material: PET, tape width: 5 mm, tape thickness: 0.5 mm

L-shaped member 208: material: PVC, thickness: 1 mm, length of one side: 5 mm

Housing frame 109: material: ABS, thickness: 2 mm

Housing end frame 110: material: ABS, thickness: 2.5 mm, width: 5 mm

Double-sided tape 115: material: PET, tape thickness: 0.5 mm

Fixing portion 301: separately described

Bolt 311: material: iron

Cushioning material 321: a laminate including one layer, two layer, or three layers of "CF45", manufactured by K.C.C. Shokai Ltd. (thickness: 25.4 mm)

Support plate 215: material: iron, thickness: 9 mm

Housing bottom plate 107 and housing protrusion portion 111: material: iron, thickness: 1.15 mm <Evaluation of Impact Resistance (Head Impact Test)>

In the specimen 200, the thickness of the cover glass 12 and the material, shape, and thickness of the fixing portion 301 were changed as shown in Table 1 below for each example, and the head impact test was performed to evaluate the impact resistance of the respective cover glass 12.

The support plate 215 of the specimen 200 was placed on a horizontal surface, and a spherical rigid model (material: iron, diameter: 165 mm, mass: 19.6 kg) not illustrated was caused to fall from a height of 793 mm at a collision speed of 3.944 m/s to collide with the collision position P (refer to FIG. 6) of the second main surface 12d of the cover glass 12 such that the energy at the collision was 152.4 J.

The test method was based on "Attachment 28 Technical Standard for Instrument Panel Impact Absorption" (hereinafter, simply referred to as "Standard") of "Article 20 Riding Accommodation" of "Safety Standard for Road Transport Vehicles" disclosed by Ministry of Land, Infrastructure, Transport and Tourism in Japan. This "Standard" states that a spherical rigid model (material: iron, diameter: 165 mm, mass: 6.8 kg) is ejected and collide with a target at a collision speed of 6.7 m/s such that the energy at the collision is 152.4 J.

That is, in the head impact test using the specimen 200, the energy at the collision was set to be the same as that of "Standard".

Deceleration of the rigid model is regulated not to exceed 784 m/s² (80 G) continuously for 3 ms (milliseconds) or longer. It was verified that all the conducted tests satisfied the regulation.

Regarding the collision position P (refer to FIG. 6) of the cover glass 12 with which the rigid model collided, it had been known from the test results of the related art that, in the head impact test, in the case where the collision is made on the vicinity of an end portion of the cover glass 12 or the liquid crystal panel 104, the cover glass 12 is more likely to break as compared to the case where the collision is made on the vicinity of the center of the cover glass 12. Therefore, in a top view of the specimen 200, the collision position P was set to be a position closer to one fixing portion 301 side than the center position of the liquid crystal panel 104, more specifically, a position which was in the center portion of a long side of the cover glass 12 and was positioned inside from an end of the liquid crystal panel 104 by 10 mm.

For each example, the specimen 200 was prepared, and the head impact test was performed. Regarding the test results, cases where the cover glass 12 did not break are represented by "A" and cases where the cover glass 12 broke are represented by "B" in Table 1 below. The cases of "A" can be evaluated as cases exhibiting excellent impact resistance such that crack does not occur even when colliding with head or the like of a passenger in a collision accident.

<Calculation of Energy Absorption Rate (Simulation)>

The energy absorption rate of the holding portion (the fixing portion 301 and the cushioning material 321) at the time when the head impact test was performed on the specimen 200, was calculated by simulation.

FIG. 9 is a graph showing an example of the result of the simulation. In FIG. 9, the horizontal axis represents the time (unit: millisecond), and the vertical axis represents the energy (unit: J). Solid line in the graph represents the kinetic energy of the rigid model, broken line in the graph represents the total strain energy of the specimen 200, and dotted line in the graph represents the strain energy of the holding portion.

As shown in FIG. 9, when the rigid model collides with the specimen 200 and the kinetic energy (solid line in the graph) of the rigid model becomes zero (i.e., when the rigid model reaches the lowest point and the speed reaches 0 (zero)), the strain energy (broken line in the graph) of the specimen 200 reaches the maximum value of 152.4 J substantially at the same time. It can be seen from the above result that substantially the entire kinetic energy of the rigid model was converted into the strain energy of the specimen 200 at the collision.

The energy (dotted line in the graph) of the holding portion shows the same behavior as the energy (broken line in the graph) of the specimen 200, and reaches the maximum value when the energy (solid line in the graph) of the rigid model reaches zero.

It can be seen from FIG. 9 that at least a part of the kinetic energy of the rigid model at the collision was converted into strain energy of the holding portion (the fixing portion 301 and the cushioning material 321).

A ratio of the strain energy (maximum value in the graph) of the holding portion to the strain energy (maximum value (=152.4 J) in the graph) of the specimen 200 at the collision of the rigid model was obtained from the graph of FIG. 9, and this was set as the energy absorption rate (unit: %) of the holding portion.

For example, in the case where the strain energy of the holding portion at the collision is "105 J", the energy absorption rate is (105/152.4)×100=69 [%].

As for the simulation, it is necessary to consider impact absorption by plastic deformation of each member. Therefore, specifically, by using a commercially available analysis program PAM-CRASH (manufactured by ESI Group), impact analysis (elastoplastic deformation analysis) was performed with finite element method (FEM) as dynamic explicit method.

As for the analysis, since the collision was made at the center portion of the long side of the cover glass 12, from the viewpoint of reducing the calculation time, a ½ symmetric model was created to perform the calculation. In addition, regarding each member of the specimen 200, not only the size but also physical property values such as density and elastic moduli such as Young's modulus and Poisson's ratio were input to the computer. The physical property values of the material used in each member are as follows.

Iron (SS400): Young's modulus: 206 GPa, Poisson's ratio: 0.30, density: $7.86 \times 10^{-6}$ kg/mm³

Aluminum: Young's modulus: 68.6 GPa, Poisson's ratio: 0.34, density: $2.71 \times 10^{-6}$ kg/mm³

ABS (acrylonitrile-butadiene-styrene copolymer): Young's modulus: 2.2 GPa, Poisson's ratio: 0.37, density: $1.05 \times 10^{-6}$ kg/mm³

PC (polycarbonate): Young's modulus: 2.2 GPa, Poisson's ratio: 0.38, density: $1.20 \times 10^{-6}$ kg/mm³

PVC (polyvinyl chloride): Young's modulus: 3.2 GPa, Poisson's ratio: 0.38, density: $1.4 \times 10^{-6}$ kg/mm³

Tempered glass (DRAGONTRAIL) obtained by tempering aluminosilicate glass: Young's modulus: 74 GPa, Poisson's ratio: 0.23, density: $2.48 \times 10^{-6}$ kg/mm³

MHM-FWD: Young's modulus: 10 kPa, Poisson's ratio: 0.30, density: $6.0 \times 10^{-7}$ kg/mm³

TAC (triacetylcellulose): Young's modulus: 4 GPa, Poisson's ratio: 0.30, density: $1.3 \times 10^{-6}$ kg/mm³

Soda-lime glass: Young's modulus: 73 GPa, Poisson's ratio: 0.23, density: $2.5 \times 10^{-6}$ kg/mm³

PET (polyethylene terephthalate): Young's modulus: 5 GPa, Poisson's ratio: 0.25, density: $1.34 \times 10^{-6}$ kg/mm³

Each portion of the specimen 200 was deformed by an external force, and when the external force reached a predetermined value or higher, was plastically deformed (in this case, the rigidity of the rigid model was set such that deformation does not occur). Therefore, regarding the materials (five materials of iron, aluminum, ABS, PC, and PVC) of the major components which were frequently used, the elastic moduli (Young's modulus and Poisson's ratio) in an elastic deformation region and the stress-strain diagram (SS curve) in a plastic deformation region were input as physical property values. More specifically, regarding the stress-strain diagram, a stress-strain diagram in consideration of strain rate dependency that is essential for conducting elastoplastic deformation analysis, was input as a physical property value.

The stress-strain diagram (true stress-true strain diagram) of each material was obtained by performing first a tensile test under conditions described below at five strain rates ($0.01~\text{s}^{-1}$, $1~\text{s}^{-1}$, $100~\text{s}^{-1}$, $500~\text{s}^{-1}$, and $1000~\text{s}^{-1}$) to obtain data of a nominal stress-nominal strain diagram, and then converting this into data of a true stress-true strain diagram.

In actual analysis, the stress-strain diagram at each strain rate was set as input data, and data between the respective curves was interpolated to perform the calculation.

(Stress-Strain Diagram in Consideration of Strain Rate Dependency)

For the tensile test, and specimen (thickness: 2.0 mm) illustrated in FIG. 10 was prepared for each material.

Regarding iron and aluminum, the sizes other than the thickness of the specimen illustrated in FIG. 10 were set as $S_1$: 17 mm, $S_2$: 11 mm, $S_3$: 8 mm, $S_4$: 16 mm, $S_5$: 8.5 mm, $S_6$: 4 mm, and $S_7$: 5 mm. Regarding the roundness of a corner portion indicated by the symbol R in FIG. 10, the radius was set as 1.5 mm.

On the other hand, regarding ABS, PC, and PVC, they were set as $S_1$: 17 mm, $S_2$: 9.2 mm, $S_3$: 8 mm, $S_4$: 16 mm, $S_5$: 8.5 mm, $S_6$: 2 mm, and $S_7$: 5 mm. Regarding the roundness of the corner portion indicated by the symbol R in FIG. 10, the radius was set as 0.6 mm.

Regarding the strain rate, if it is assumed that a test is performed by using a specimen having a parallel portion initial length (indicated by the symbol $S_3$ in FIG. 10) of 25 mm and setting a crosshead speed to a head impact collision speed (6700 mm/s) in the test, the initial strain rate (unit: $s^{-1}$) is $6700/25=268$ $s^{-1}$.

Therefore, the tensile test was performed by using a Hopkinson pressure bar at a strain rate of 100 $s^{-1}$, 500 $s^{-1}$ or 1000 $s^{-1}$, or by using a detection block type material testing machine at a strain rate of 0.01 $s^{-1}$ or 1 $s^{-1}$.

Data of the stress-strain diagram of the cushioning material 321 in consideration of strain rate dependency was obtained in the following procedure.

First, the cushioning material 321 was cut into a predetermined shape (thickness: 25 mm, size: 100 mm×500 mm), this was interposed between metal disks having a diameter of 200 mm, and a load was applied thereto from above by using a 10 kN load cell (AUTOGRAPH) at a rate of 5 mm/min, 0.1 m/min, or 1 m/min. Based on the load and the displacement obtained at this time, the stress-strain diagram in consideration of the strain rate dependency (at a low rate) during the compression was created.

Next, a stress-strain diagram at a higher rate was also obtained. Specifically, in the same manner as in the head impact test, the rigid model was caused to fall on the cushioning material by changing the dropping height, and the sinking amount of the cushioning material was measured by imaging with a high-speed camera. At this time, the sinking amount of the cushioning material was also measured at a higher strain rate of 10 $s^{-1}$, 100 $s^{-1}$ or 200 $s^{-1}$. Referring to the sinking amount of the cushioning material and the stress-strain diagram at a low rate, the stress-strain diagram at a high rate was created based on the sinking amount of the cushioning material at a high rate.

In actual analysis, the stress-strain diagram at each strain rate was set as input data, and data between the respective curves was interpolated to perform the calculation.

(Regarding Calculation Expression of Strain Energy)

In general, the calculation of the strain energy was calculated from the following theoretical expression. In the analysis using the commercially available program as described above, the calculation was performed by using a calculator with the following expression based on the stress-strain diagram which was input regarding each member. In this impact analysis, the fracture of the member was not considered.

At one point in a general frame structure member, it is considered that a relationship shown in a graph of FIG. 11 is established, between a normal stress σ and a normal strain ε in a member axis direction or between a shearing stress τ and a shearing strain γ.

First, a strain energy U and a strain energy density U* are obtained as follows.

A strain energy accumulating per unit volume in a strain increase between dε and dγ, that is, an increase dU* in strain energy density is obtained by the following Expression (2) (refer to FIG. 11).

[Math. 1]

$$dU^* = \sigma d\varepsilon + \tau d\gamma \tag{2}$$

Accordingly, the strain energy density U* accumulating until the strain reaches from 0 to given values ε and γ is represented by the following Expression (3) (refer to FIG. 11).

[Math. 2]

$$U^* = \int_0^\varepsilon \sigma(\varepsilon)d\varepsilon + \int_0^\gamma \tau(\gamma)d\gamma \tag{3}$$

In addition, the strain energy U accumulating in a structure or a structure portion is represented by the following Expression (4).

$$U = \int_V U^* dV \tag{4}$$

The description of a complementary strain energy density U*c in FIG. 11 is omitted.

TABLE 1

| | Cover Glass | Cushioning Material | Holding Portion | | | Energy Absorption | |
| | | | Fixing Portion | | | | |
| | Thickness x [mm] | Number of Layers | Shape | Material | Thickness [mm] | Rate y [%] | Impact Resistance |
|---|---|---|---|---|---|---|---|
| Ex. 1 | 0.56 | 2 | L-Shape | SS | 1.0 | 53 | B |
| Ex. 2 | 0.56 | 2 | L-Shape | AL | 1.0 | 65 | B |
| Ex. 3 | 0.56 | 2 | Corrugated L-shape | AL | 0.5 | 69 | B |
| Ex. 4 | 0.56 | 3 | Corrugated L-shape | AL | 0.5 | 81 | A |
| Ex. 5 | 0.7 | 2 | L-Shape | SS | 1.5 | 33 | B |
| Ex. 6 | 0.7 | 2 | L-Shape | SS | 1.0 | 54 | B |
| Ex. 7 | 0.7 | 2 | L-Shape | AL | 1.0 | 65 | B |
| Ex. 8 | 0.7 | 2 | Corrugated L-shape | AL | 0.5 | 69 | A |

TABLE 1-continued

|  | Cover Glass Thickness x [mm] | Cushioning Material Number of Layers | Holding Portion Fixing Portion Shape | Fixing Portion Material | Fixing Portion Thickness [mm] | Energy Absorption Rate y [%] | Impact Resistance |
|---|---|---|---|---|---|---|---|
| Ex. 9 | 0.7 | 3 | Corrugated L-shape | AL | 0.5 | 81 | A |
| Ex. 10 | 0.7 | 2 | L-Shape st | SS | 1.5 | 34 | B |
| Ex. 11 | 0.7 | 2 | Corrugated L-shape st | AL | 0.5 | 70 | A |
| Ex. 12 | 1.1 | 2 | L-Shape | SS | 1.5 | 34 | B |
| Ex. 13 | 1.1 | 2 | L-Shape | SS | 1.2 | 44 | B |
| Ex. 14 | 1.1 | 2 | L-Shape | SS | 1.0 | 55 | A |
| Ex. 15 | 1.1 | 2 | L-Shape | AL | 1.0 | 66 | A |
| Ex. 16 | 1.1 | 2 | Corrugated L-shape | AL | 0.5 | 72 | A |
| Ex. 17 | 1.3 | 2 | L-Shape | SS | 3.0 | 29 | B |
| Ex. 18 | 1.3 | 2 | L-Shape | SS | 1.5 | 34 | B |
| Ex. 19 | 1.3 | 2 | L-Shape | SS | 1.2 | 44 | A |
| Ex. 20 | 1.3 | 2 | L-Shape | SS | 1.0 | 55 | A |
| Ex. 21 | 1.3 | 2 | L-Shape | AL | 1.0 | 67 | A |
| Ex. 22 | 1.3 | 2 | Corrugated L-shape | AL | 0.5 | 74 | A |
| Ex. 23 | 1.3 | 2 | L-Shape st | SS | 1.5 | 35 | B |
| Ex. 24 | 1.3 | 2 | L-Shape st | AL | 1.0 | 68 | A |
| Ex. 25 | 2.0 | 1 | L-Shape | SS | 3.0 | 27 | B |
| Ex. 26 | 2.0 | 2 | L-Shape | SS | 3.0 | 30 | A |
| Ex. 27 | 2.0 | 2 | L-Shape | SS | 1.5 | 34 | A |
| Ex. 28 | 2.0 | 2 | L-Shape | SS | 1.0 | 57 | A |
| Ex. 29 | 2.0 | 2 | L-Shape | AL | 1.0 | 70 | A |
| Ex. 30 | 2.0 | 2 | Corrugated L-shape | AL | 0.5 | 78 | A |

Described in "Material" of "Fixing Portion" in Table 1, SS means iron (SS400), and "AL" means aluminum.

The results of Table 1 are plotted in a graph of FIG. 12, in FIG. 12, the vertical axis represents the energy absorption rate y (unit: %), the horizontal axis represents the thickness x (unit: mm) of the cover glass 12, and the results ("A" or "B") of impact resistance are reflected. The curve in FIG. 12 is expressed by $y = -37.1 \times \ln(x) + 53.7$.

It can be clearly seen from the graph of FIG. 12 that, in the case where Expression (1) is not satisfied (Comparative Examples), the cover glass breaks; on the other hand, in the case where Expression (1) is satisfied (Examples), the cover glass does not break.

The present invention has been described in detail by reference to the specific embodiments. However, it is obvious to those skilled in the art that various modifications and changes can be made within a range not departing from the spirit and scope of the present invention.

The present application is based on Japanese Patent Application (No. 2015-114616) filed on Jun. 5, 2015, the entirety of which is incorporated herein by reference.

DESCRIPTION OF REFERENCE NUMERALS AND SIGNS

10: Adhesive layer-equipped cover glass
12: Cover glass
12a: Disposition region
12b: Peripheral portion
12c: First main surface of cover glass
12d: Second main surface of cover glass
14: Adhesive layer
14a: First main surface of adhesive layer
14b: Side surface of adhesive layer
16: Protective film
16a: First main surface of protective film
20: Light shielding portion
100: Vehicle-mounted display device
100b: Modification example of vehicle-mounted display device
102: Backlight unit
104: Liquid crystal panel (Display panel)
104a: Display surface
106: Housing
106a: End surface of housing
107: Housing bottom plate
108: Opening portion
109: Housing frame
110: Housing end frame
111: Housing protrusion portion
115: Double-sided tape
200: Specimen
200b: Modification example of specimen
207: Double-sided tape
208: L-shaped member
215: Support plate
301: Fixing portion (holding portion)
301b: Modification example of fixing portion
311: Bolt
321: Cushioning material (impact absorbing portion, holding portion)
401: Interior member
402: Cover of interior member
411: Recessed portion
411a: Bottom surface of recessed portion
P: Collision position

The invention claimed is:

1. A vehicle-mounted display device that is disposed in an interior member of a vehicle, the vehicle-mounted display device comprising:
   a display panel;
   a cover glass that covers the display panel;
   a housing that accommodates the display panel; and
   a holding portion that bolds a position of the housing,
   wherein the cover glass is a tempered glass having a thickness being from 0.5 to 2.5 mm, and a thickness of a compressive stress layer being 10 μm or more, and
   Wherein the holding portion comprises:
   an impact absorbing portion that has impact absorbability and is directly disposed on a back surface side of the housing; and
   a fixing portion that fixes the position of the housing on the interior of the member without interposing the impact absorbing portion.

2. The vehicle-mounted display device according to claim 1, wherein the cover glass is a soda-lime glass or an aluminosilicate glass.

3. The vehicle-mounted display device according to claim 1, wherein the cover glass comprises, indicated by mol %, from 50 to 80% of $SiO_2$, from 1 to 20% of $Al_2O_3$, from 6 to 20% of $Na_2O$, from 0 to 11% of $K_2O$, from 0 to 15% of MgO, from 0 to 6% ref CaO, and from 0 to 5% of $ZrO_2$.

4. The vehicle-mounted display device according to claim 1, wherein the impact absorbing portion is a cushioning material, a honeycomb mechanism, a rotation mechanism, or a sliding mechanism.

5. The vehicle-mounted display device according to claim 1, wherein a material of the fixing portion is a metal.

6. The vehicle-mounted display device according to claim 1, wherein the fixing portion has an L-shape or a corrugated L-shape in cross-section.

7. The vehicle-mounted display device according to claim 1, wherein the fixing portion and the housing are joined through a bolt.

8. The vehicle-mounted display device according to claim 1, further comprising a light shielding portion formed on a peripheral portion of the cover glass.

9. The vehicle-mounted display device according to claim 1,
   wherein the display panel and the cover glass are bonded to each other through an adhesive layer.

10. The vehicle-mounted display device according to claim 9, wherein the adhesive layer has a thickness of from 5 to 400 μm.

11. The vehicle-mounted display device according to claim 9, Wherein the adhesive layer has a storage shear modulus of from 5 kPa to 5 MPa.

12. The vehicle-mounted display device according to claim 1, wherein the cover glass is bonded to a top surface of a housing frame of the housing through a double-sided tape.

13. The vehicle-mounted display device according to claim 1, wherein the display panel is a liquid crystal panel, an organic EL panel, a PDP, or an electronic ink panel.

14. The vehicle-mounted display device according to claim 1, which is an embedded type or a standing type.

15. The vehicle-mounted display device according to claim 8, wherein the shielding portion has a frame shape.

16. The vehicle-mounted display device according to claim 1, further comprising a backlight unit between the display panel and a bottom plate of the housing.

17. A vehicle comprising the vehicle-mounted display device as described in claim 1.

* * * * *